US010638788B2

(12) United States Patent
Mott et al.

(10) Patent No.: US 10,638,788 B2
(45) Date of Patent: May 5, 2020

(54) METHOD AND SYSTEM FOR SPRAY DRYING INSECTS

(71) Applicant: Aspire Food Group US, Austin, TX (US)

(72) Inventors: Gabriel Mott, Austin, TX (US); Serena Harrington, Austin, TX (US); Shobhita Soor, Austin, TX (US); Mohammed Ashour, Austin, TX (US); Michael Todd Hall, Austin, TX (US)

(73) Assignee: ASPIRE FOOD GROUP USA INC., Austin, TX (US)

( * ) Notice: Subject to any disclaimer, the term of this patent is extended or adjusted under 35 U.S.C. 154(b) by 140 days.

(21) Appl. No.: 15/586,811

(22) Filed: May 4, 2017

(65) Prior Publication Data
US 2017/0318855 A1    Nov. 9, 2017

Related U.S. Application Data

(60) Provisional application No. 62/331,831, filed on May 4, 2016.

(51) Int. Cl.
*A23J 1/00* (2006.01)
*A23P 10/40* (2016.01)
(Continued)

(52) U.S. Cl.
CPC ............... *A23P 10/40* (2016.08); *A21D 2/34* (2013.01); *A23J 1/00* (2013.01); *A23J 1/02* (2013.01);
(Continued)

(58) Field of Classification Search
CPC .......... A23L 3/16245; A23L 3/40; A23L 3/46; A23L 13/10; A21D 2/34; A21D 6/003; A23J 1/00; A23J 1/02; A23V 2200/126; A23V 2300/10; A23V 2300/24; A23V 2300/26; A23V 2250/542; A23V 2300/41; B01D 1/16–20; A23K 10/20; A23K 30/20; A23K 50/70–75; A23P 10/40; A23P 10/22
(Continued)

(56) References Cited

U.S. PATENT DOCUMENTS 3,220,333 A  * 11/1965 Davison ................... A23B 4/07
                                                            99/475
3,236,285 A  *  2/1966 Mee ........................ A23C 1/04
                                                          159/4.01
(Continued)

FOREIGN PATENT DOCUMENTS

BR       102015028820 A    5/2017
CN        104756956 A      7/2015
(Continued)

*Primary Examiner* — Drew E Becker
(74) *Attorney, Agent, or Firm* — Lee & Hayes, P.C.

(57) ABSTRACT

In some examples, a system may be configured to generating flour having a uniform particle size of less than 100 Microns from whole insects. For example, the may include generating a slurry from whole insects by adding water while blending the whole insects using one or more mixers to generate an insect slurry. In some cases, the water is added to the insect parts to reduce the viscosity and to assist in separating the whole insects into parts. In some cases, the insect slurry may be filtered.

18 Claims, 7 Drawing Sheets

(51) Int. Cl.
*A23L 13/10* (2016.01)
*A23P 10/22* (2016.01)
*A21D 2/34* (2006.01)
*A23K 30/20* (2016.01)
*A23K 10/20* (2016.01)
*A23J 1/02* (2006.01)
*A23L 3/46* (2006.01)

(52) U.S. Cl.
CPC .............. *A23K 10/20* (2016.05); *A23K 30/20* (2016.05); *A23L 3/46* (2013.01); *A23L 13/10* (2016.08); *A23P 10/22* (2016.08); *A23V 2200/126* (2013.01); *A23V 2250/542* (2013.01); *A23V 2300/10* (2013.01); *A23V 2300/41* (2013.01)

(58) Field of Classification Search
USPC ....... 426/641, 645, 646, 443–444, 455, 464, 426/467, 469, 471–473, 479, 518–521, 426/524
See application file for complete search history.

(56) References Cited

U.S. PATENT DOCUMENTS

| | | | | |
|---|---|---|---|---|
| 3,324,567 A * | 6/1967 | Franck | ..................... | A23C 1/05 34/168 |
| 3,402,053 A * | 9/1968 | Longe | ..................... | A23B 4/07 426/506 |
| 3,471,874 A * | 10/1969 | Dixon | ..................... | A47K 13/12 16/266 |
| 3,829,589 A * | 8/1974 | Matsunaga | ............. | A23L 25/30 426/427 |
| 3,851,085 A * | 11/1974 | Rodgers et al. | .......... | A23J 1/12 426/288 |
| 3,949,096 A * | 4/1976 | Johnson | ................... | A61K 9/50 426/302 |
| 3,956,521 A * | 5/1976 | Pisecky | ..................... | A23C 1/04 426/588 |
| 4,062,277 A * | 12/1977 | Powers | ..................... | A23B 4/07 99/483 |
| 4,062,979 A * | 12/1977 | Haak | ....................... | A23L 27/18 426/44 |
| 4,259,361 A * | 3/1981 | Procter | ..................... | C05F 1/00 426/285 |
| 5,433,970 A * | 7/1995 | Wong | ....................... | A23L 25/30 426/518 |
| 2002/0068122 A1* | 6/2002 | Hathi | ....................... | A23L 25/30 426/473 |
| 2005/0031769 A1* | 2/2005 | Watanabe | ................ | A23L 3/46 426/640 |
| 2006/0051477 A1* | 3/2006 | Sann | ....................... | A23L 3/365 426/524 |
| 2011/0081452 A1 | 4/2011 | Hem et al. | | |
| 2012/0148712 A1* | 6/2012 | Guilfoyle | ............. | A23L 33/175 426/231 |
| 2012/0329135 A1 | 12/2012 | Lopez-Cervantes | | |
| 2013/0122151 A1* | 5/2013 | Ghaedian | ............... | A23B 7/026 426/71 |
| 2013/0319334 A1 | 12/2013 | Newton et al. | | |
| 2015/0132433 A1* | 5/2015 | Dossey | ..................... | A23L 3/00 426/2 |
| 2015/0135974 A1* | 5/2015 | Ambrosi | ................. | A47J 36/24 99/483 |
| 2016/0037808 A1* | 2/2016 | Miller | ..................... | A23L 7/101 426/622 |
| 2017/0042131 A1 | 2/2017 | Unger | | |
| 2017/0202191 A1 | 7/2017 | Marchant et al. | | |
| 2017/0251700 A1 | 9/2017 | Doane et al. | | |
| 2018/0000121 A1* | 1/2018 | Armenjon | ............... | A23L 33/17 |
| 2018/0310591 A1* | 11/2018 | Cadesky | .................. | A23J 3/04 |
| 2018/0317520 A1* | 11/2018 | Bouzari | ................... | A23J 1/00 |

FOREIGN PATENT DOCUMENTS

| | | |
|---|---|---|
| CN | 104770326 A | 7/2015 |
| CN | 106269811 A | 1/2017 |
| CN | 106279727 A | 1/2017 |
| CN | 106305632 A | 1/2017 |
| CN | 106359306 A | 2/2017 |
| CN | 106359311 A | 2/2017 |
| CN | 106508823 A | 3/2017 |
| CN | 106509504 A | 3/2017 |
| CN | 206043148 U | 3/2017 |
| CN | 206062034 U | 4/2017 |
| CN | 206078668 U | 4/2017 |
| CN | 206101346 U | 4/2017 |
| CN | 106614400 A | 5/2017 |
| CN | 106719453 A | 5/2017 |
| CN | 106733666 A | 5/2017 |
| CN | 106902958 A | 6/2017 |
| CN | 106942163 A | 7/2017 |
| CN | 106942164 A | 7/2017 |
| CN | 206334847 U | 7/2017 |
| CN | 206334868 U | 7/2017 |
| CN | 206354225 U | 7/2017 |
| CN | 206423511 U | 8/2017 |
| CN | 206442964 U | 8/2017 |
| CN | 107114325 A | 9/2017 |
| CN | 107136025 A | 9/2017 |
| DE | 102016115189 B3 | 8/2017 |
| KR | 101691584 B | 1/2017 |
| KR | 101695548 B | 1/2017 |
| KR | 101716763 B | 3/2017 |
| KR | 101716766 B | 3/2017 |
| KR | 20170030402 A | 3/2017 |
| KR | 101741999 B | 5/2017 |
| KR | 20170058564 A | 5/2017 |
| KR | 101747928 B | 6/2017 |
| KR | 20170068752 A | 6/2017 |
| KR | 101755167 B | 7/2017 |
| KR | 20170080988 A | 7/2017 |
| KR | 20170085337 A | 7/2017 |
| PL | 413266 A | 1/2017 |
| PL | 413267 A | 1/2017 |
| RU | 2615636 C | 4/2017 |
| WO | WO16153338 A1 | 9/2016 |
| WO | WO16153339 A1 | 9/2016 |
| WO | WO16166465 A1 | 10/2016 |
| WO | WO16166471 A1 | 10/2016 |
| WO | WO17007309 A1 | 1/2017 |
| WO | WO17007310 A1 | 1/2017 |
| WO | WO17017313 A1 | 2/2017 |
| WO | WO17066880 A1 | 4/2017 |

* cited by examiner

700

```
┌─────────────────────────────────────┐
│     FREEZE WHOLE INSECTS            │
│              702                    │
└─────────────────────────────────────┘
                  ↓
┌─────────────────────────────────────┐
│   APPLY HEAT TO THE WHOLE INSECTS   │
│              704                    │
└─────────────────────────────────────┘
                  ↓
┌─────────────────────────────────────────────────────────────────┐
│ GENERATE A FIRST SLURRY FROM THE WHOLE INSECTS, THE FIRST SLURRY │
│ HAVING A FIRST SET OF PARTICLES, THE FIRST SET OF PARTICULARS    │
│ HAVING A FIRST PARTIAL SIZE                                      │
│                          706                                     │
└─────────────────────────────────────────────────────────────────┘
                  ↓
┌─────────────────────────────────────────────────────────────────┐
│ GENERATE A SECOND SLURRY FROM THE FIRST SLURRY, THE SECOND       │
│ SLURRY HAVING A SECOND SET OF PARTICLES, THE SECOND SET OF       │
│ PARTICULARS HAVING A SECOND PARTIAL SIZE RANGE LESS THAN THE     │
│ FIRST PARTICLE SIZE                                              │
│                          708                                     │
└─────────────────────────────────────────────────────────────────┘
                  ↓
┌─────────────────────────────────────┐
│     PASTEURIZE THE SECOND SLURRY    │
│              710                    │
└─────────────────────────────────────┘
                  ↓
┌─────────────────────────────────────────────────────────────────┐
│ DISPERSE THE SECOND SLURRY INTO A DRYING CHAMBER USING A ROTARY  │
│ ATOMIZER                                                         │
│                          712                                     │
└─────────────────────────────────────────────────────────────────┘
                  ↓
┌─────────────────────────────────────────────────────────────────┐
│ SEPARATE PARTICLES INTO A SECOND SET OF PARTICLES HAVING A       │
│ PARTICLE SIZE SMALLER THAN A THIRD PARTICLE SIZE FROM A FOURTH   │
│ SET OF PARTICLES HAVING A PARTICLE SIZE GREATER THAN THE THIRD   │
│ PARTICLE SIZE, THE THIRD PARTICLE SIZE LESS THAN THE FIRST       │
│ PARTICLE SIZE                                                    │
│                          714                                     │
└─────────────────────────────────────────────────────────────────┘
                  ↓
┌─────────────────────────────────────┐
│   REPROCESS THE FOURTH SET OF       │
│           PARTICLES                 │
│              716                    │
└─────────────────────────────────────┘
```

FIG. 7

METHOD AND SYSTEM FOR SPRAY DRYING INSECTS

RELATED APPLICATION

This application claims priority to U.S. Provisional Application No. 62/331,831 to Mott et al., entitled "Processor for Optimizing Harvests of Insects," filed May 4, 2016, the entirety of which is incorporated herein by reference thereto.

BACKGROUND

Insects have been found to be a promising source of high quality protein with a substantially lower ecological footprint than typical livestock. In some cases, insects may be processed to form a flour. Unfortunately, current techniques for processing insects for flour fail to produce an end product with a wide particle size distribution and large average particle size. Often, using the current techniques of roasting whole insects and then grinding produces a flour having a mix of fine grain particulars and fragments that are visibly identifiable as insect parts. The lack of uniformity in particle size results in increased difficulty when cooking with the resulting flour. Attempts have been made to spray dry insects to generate a product with smaller, more uniform particle size. However, most conventional spray drying approaches have failed to do this.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 7 provides an example flow diagram illustrating example processes for generating insect flour described above.

DETAILED DESCRIPTION

Figure 1:
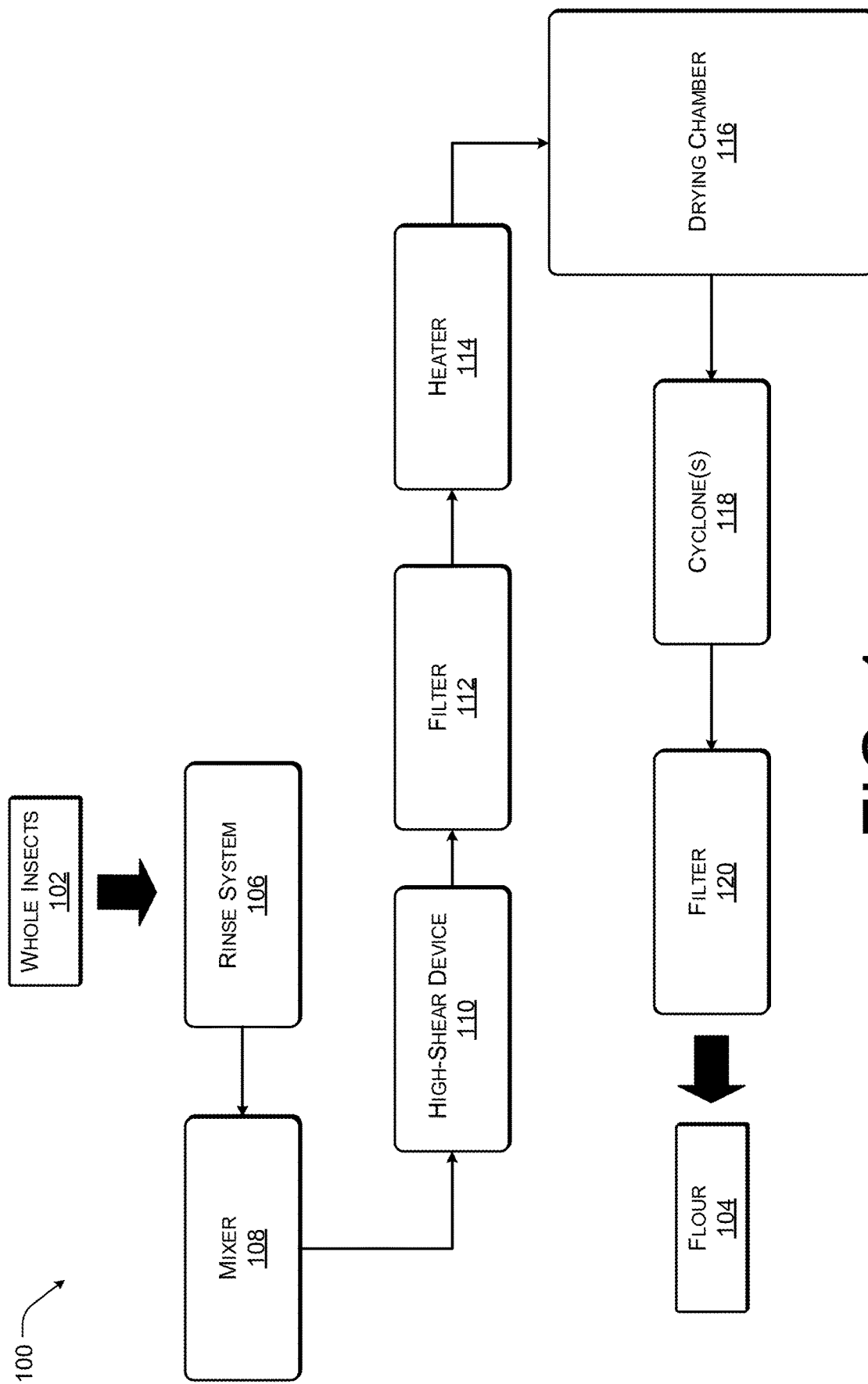
FIG. 1 illustrates an example system for processing whole insects according to some implementations.

Described herein are implementations and techniques for generating flour from whole insects. For example, when dealing with some insects, such as crickets, the insects may be processed from a whole state (either alive or dead) into a fine particular or "flour" state. The flour may then be used as a high protein substitute for other types of foods including traditional bleached or wheat flours. Traditionally, the whole insects are ground, wet-ground, or milled to produce the flour. However, when using conventional techniques often results in a mix of powder and large visible insect parts which results in an unsightly and difficult to use product.

In some cases, described herein are methods for generating insect based flour having a uniform particle size of less than 100 Microns. For example, the method may include generating a slurry from whole insects by adding water while blending the whole insects using a low-shear mixer to generate a coarse insect slurry containing a mix of coarsely chopped or blended insect parts. In some cases, the water is added to the insect parts to reduce the viscosity and to assist in separating the whole insects into parts. In some cases, the water may be applied at a temperature of approximately 140 degrees Fahrenheit (° F.), while in other cases the water may be at room temperature. In some specific examples, the whole insects may be processed by the low-shear mixer in the absence of water.

The coarse insect slurry is then pumped to or otherwise placed within a high-shear mixer to further reduce the particle size of the coarse slurry and generate a fine grain slurry. For example, the fine grain slurry may be ground to produce a slurry including particulars of less than a threshold size, such as 100 Microns in size. In some cases, the fine grain slurry may be filtered to remove any particles exceeding the threshold size. In some specific cases, the fine grain slurry may be dried for further processing. For instance, the dried slurry may be re-suspended and passed through the high shear mixer a second time to further assist in reducing the particle size below the threshold size. In some instance, the fine grain slurry may be passed through a filter a second time following the second pass of the high shear-mixer. In one particular example, the fine grain slurry may be mixed with any remaining post-shear fluid in a recirculating loop back to the mixer.

The fine grain slurry is pasteurized after processing by the high-shear mixer is complete. In some cases, the fine grain slurry is pasteurized by heating the slurry for fifteen minutes to one hour maintaining a temperature of approximately 185° F. In other cases, the slurry may be heated a period of between fifteen minutes to one hour maintaining a temperature of approximately 161° F. In some cases, the slurry may be further mixed or blended during the pasteurization process.

The pasteurized slurry may be dispensed into a drying chamber or undergo a spray drying process. In some case, the rotary atomizer dispensed the slurry at a rate of approximately 1700 pounds per hour. In other cases, the flow rate associated with dispensing the slurry was between approximately 500 to 2000 pounds per hour. In one specific example, the flow rate of the rotary atomizer is 1715 pounds per hour. For example, the drying chamber may be approximately 14 feet in diameter and approximately 14 feet tall and set to a temperature of 150° F. In another example, the drying chamber may be between 10 feet in diameter and 22 feet in diameter and 10 feet tall and 22 feet tall. In some cases, the drying chamber may be flat-bottomed or cone-bottomed. In convention methods that utilize smaller drying chambers or other shapes of chambers, the wet slurry fails to dry at an appropriate rate and typically impacts the interior walls of the drying chamber and burning or sticking to the interior surface, thereby destroying at least a portion of the flour.

The slurry may be dispensed using a using a rotary atomizer. In some cases, the rotary atomizer may include a disk diameter of between approximately 170 millimeters (mm) and approximately 300 mm. The disk speed may be set at between approximately 5000 rotations per minute (RPMs) and approximately 25,000 RPMs. In some cases, the rotary atomizer may also have a broad aperture unlike the conventional methods that utilize high-pressure spray nozzles, which are highly susceptible to blockage due to the fluid's characteristics introduced by the insect partials in the slurry and often results in unacceptable delays.

In some cases, some amount of the insect particles may be greater than the desired particle size. Thus, the product resulting after spray drying may be passed through one or more screens to separate the particle sizes. For example, the resulting product may be forced through at least two cyclones as well as a 20 mesh to a 40 mesh sifter. For example, the sifter may separate the larger insect parts or agglomerated particles from the fine grain particles that may be utilized as flour. In some cases, the larger particles may be introduced into another insect slurry and reprocessed via the spray drying to further reduce the partial size below the desired proportions.

FIG. 1 illustrates an example system 100 for processing whole insects according to some implementations. For example, some insects 102 are regularly consumed in a "flour" state in addition to a whole or semi-whole state. In some cases, the flour 104 is used as a high protein substitute for other types of foods including traditional bleached or wheat flours. Traditionally, the whole insects 102 are ground, wet-ground, or milled to produce the flour 104. However, using traditional techniques often results in a mix of powder and large visible insect parts which results in an unsightly product and can affect the quality and consistency of any foodstuff made with the flour 104.

In the current example, a system 100 may be at an insect or food processing facility for converting the whole insects 102, such as crickets, into flour 104. In this example, the whole insects 102 may be heated or thawed by a heater (not shown). For instance, the whole insects 102 may be frozen prior to processing to preserve the food product for longer durations.

Initially, the whole insects 102 are placed into a rinse device 106. For example, the rinse device 106 may include a wire basket or container that includes a mesh configured to allow water to pass but to retain the whole crickets 102. In some cases, the rinse device 106 may apply warm water to begin the thawing processes of the whole crickets 102 when frozen. For instance, the water may be at room temperature or within a range of approximately 35° F. to approximately 80° F. In some cases, the whole crickets 102 may be sprayed with water for a period of greater than one hour. In other cases, the whole crickets 102 may be sprayed with water for a period of greater than two hours. In still other cases, the whole crickets 102 may be sprayed with water for a period of greater than two hours and less than three hours. In one particular example, the whole crickets 102 may be sprayed with the water for a period of approximately two hours.

The whole insects 102 are initially provided to a mixer 108. For instance, the mixer 106 may be a low-shear mixer configured to convert the whole insects 102 into a coarse slurry by mixing the insects 102 with water. In one implementation, the mixer 108 may mix the whole insects 102 while adding water at a ratio of approximately 1.5 lb of cricket to 2 lbs of water, with a resulting coarse slurry that is approximately 42% insects and 58% water. In some cases, the coarse slurry may have a range of 30% to 50% insect and 50% to 70% water. The coarse slurry may also include insect parts or particles having a size of less than approximately 3 cm. In another example, the coarse slurry may also include insect parts or particles having a size of less than approximately 5 cm. In some cases, the mixer 108 may include an impeller that is initially set to a rate of between approximately 1000 rotations per minute (RPMs) and 1600 RPMs. In some situations, after a period of time has elapsed, the impeller may be increased to a rate of between approximately 1400 RMPs and approximately 2000 RPMs. In one particular example, the impeller that is initially set to a rate of approximately 1440 RPMs and then increased to a rate of 1800 RMPs. In some case, the water added to the mixer 108 may be at a temperature of approximately 145° F. In other cases, the water added to the mixer 108 may be at a temperature of between approximately 100° F. and approximately 180° F. In one particular example, the mixer 108 may also be configured to heat or apply steam to the coarse slurry. For example, the steam or heat may be turned on and set at a temperature of approximately 145° F. when the rater of the impeller is increased.

The coarse slurry may be provided or pumped to the high-shear device 110 to generate a fine slurry, or a slurry having particles of a size of 100 Microns or less. In some cases, the coarse slurry may be passes through the high-shear device 110 via multiple passes with the high-shear device 110 set to different configurations. For instance, in one particular situation, during the first pass, the high-shear device 110 may have stators set to a coarse, medium, fine configuration and, during a second, pass the high-shear device 110 may have stators set to a fine, very fine, ultra fine configuration. In some cases, the high-shear device 110 may be set to rotational speed of between approximately 35 hertz (HZ) and approximately 80 Hz.

In the current example, the fine slurry may be filtered by filter 112 to remove any particles of greater than approximately 100 Microns from the slurry. The fine slurry is pasteurized by the heater 114. For example, the heater may pasteurize the slurry by heating the slurry to a temperature of approximately 185° F. In other cases, the heater may pasteurize the slurry by heating the slurry to a temperature of approximately 161° F. In still other cases, the slurry may be pasteurized by heating to 155° F. In some instances, the slurry may be held at temperature for a length of approximately 35 minutes. In other cases, the slurry may be held at temperature for a length of time approximately 30 minutes to approximal 40 minutes in duration or for a length of time approximately 30 minutes to approximal 60 minutes in duration. In some cases, the slurry may be held at temperature for a length of time greater than or equal to 30 minutes or greater than or equal to 35 minutes.

The pasteurized slurry is provided to the rotatory atomizer associated with a drying chamber 116. For instance, the rotatory atomizer may be configured to dispense or spray the slurry into the drying chamber 116. In some cases, the rotary atomizer may include a disk diameter of between approximately 170 mm and approximately 300 mm. The disk speed may be between approximately 5000 RPMs and approximately 25,000 RPMs.

As the slurry is dispensed into the drying chamber 116 by the rotatory atomizer, the drying chamber 116 may apply heat at a temperature which causes the water in the slurry to evaporate prior to the slurry impacting the walls of the drying chamber 114. In some implementations, the drying chamber 116 may be approximately 14 feet in diameter and approximately 14 feet tall and set to a temperature of 150° F. In another example, the drying chamber 116 may be between 10 feet in diameter and 22 feet in diameter and 10 feet tall and 22 feet tall. In some cases, the drying chamber 116 may be flat-bottomed or cone-bottomed. In some instances, the drying chamber 116 may be configured to evaporate water at a rate of approximal 1500 lb of water per hour. In other cases, the drying chamber 116 may be configured to evaporate water at a rate of approximal 1300 lb of water per hour to 1700 lbs of water per hour. In yet other cases, the drying chamber 116 may be configured to evaporate water at a rate of approximal 1000 lb of water per hour to 2000 lbs of water per hour.

The dried particles may be collected from the drying chamber 116 and deposited into one or more cyclones 118. The cyclones 118 may be used to separate the dried particles removing any particle that is too small from the flour 104 or below a minimum threshold. The remaining particles may then be passed through one or more final filters 120 to remove any particles from the flour that are more than a maximum threshold. For example, the filter 120 may include one or more screens/meshes of various sizes, such as a 40-mesh filter. In one particular example, the slurry may be passed through two cyclones and a 40 mesh Kason sifter.

In the current example, the processing devices 106-120 are shown as individual devices. However, it should be understood that the processing devices 106-120 may be combined in whole or in part. For example, the high-shear device 110, filter 112, and/or heater 114 may be incorporated into the mixer 108.

Figure 2:
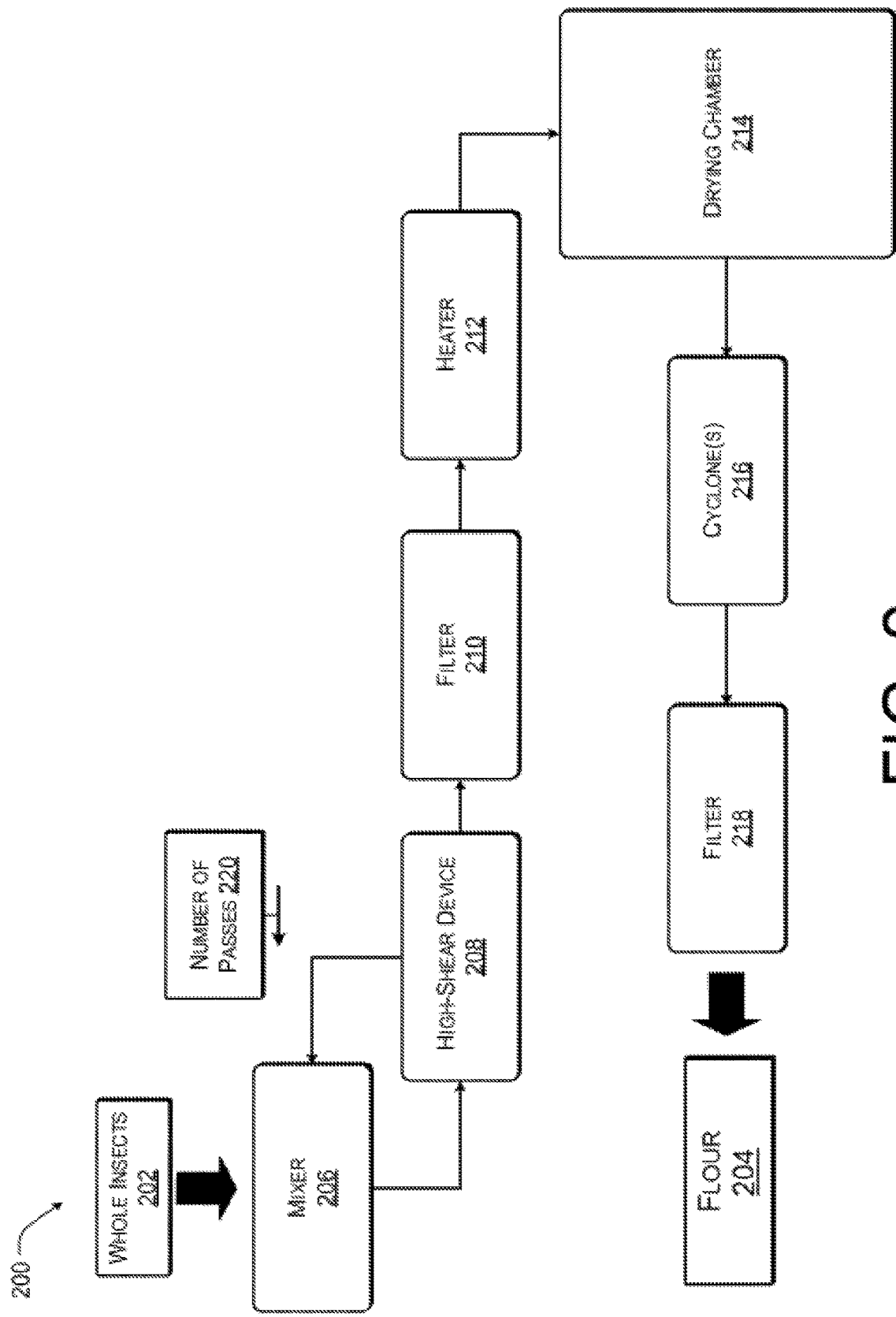
FIG. 2 illustrates an example flow diagram showing an illustrative process associated with generating flour from insects according to some implementations.

FIG. 2 illustrates another example system 200 for processing whole insects according to some implementations. In the current example, the system 200 may be at an insect or food processing facility for converting the whole insects 202, such as crickets, into flour 204. In this example, the whole insects 202 are initially provided to a mixer 206. For instance, the mixer 206 may be a low-shear mixer configured to convert the whole insects 202 into a coarse slurry by mixing the insects 202 with water. In some cases, the mixer 206 may include an impeller that is initially set to a rate of between approximately 1000 rotations per minute (RPMs) and 1600 RPMs. In some situations, after a period of time has elapsed, the impeller may be increased to a rate of between approximately 1400 RMPs and approximately 2000 RPMs. In one particular example, the impeller that is initially set to a rate of approximately 1440 RPMs and then increased to a rate of 1800 RMPs. In some case, the water added to the mixer 206 may be at a temperature of approximately 145° F. In other cases, the water added to the mixer 206 may be at a temperature of between approximately 100° F. and approximately 180° F. In one particular example, the mixer 108 may also be configured to heat or apply steam to the coarse slurry. The coarse slurry may be provided or pumped to the high-shear device 208 to generate a fine slurry, or a slurry having particles of a size of 100 Microns or less. In the current example, the mixer 204 and the high-shear device 208 may be coupled to a recirculation loop. For instance, the loop may allow the fine slurry, or post shear liquids, to be mixed with additional water or additional whole insects 202 and reprocessed by the mixer 206 and high-shear device 208. In other instances, the loop may allow the slurry to make multiple passes through the mixer 206 and high-shear device 208 to increase the likelihood that the particle size of the slurry is less than 100 Microns. For example, the loop may include a threshold number of passes 220 that the slurry will make through the mixer 206 and the high-shear device 208. In some cases, the high-shear device 208 may be set to rotational speed of between approximately 35 HZ and approximately 60 Hz on the first pass and a rotational speed of between approximately 50 HZ and approximately 80 Hz on the second pass. While high-shear device 208 is illustrated as a single device, in some cases, the high-shear device 208 may include multiple high-shear devices 208 having various configurations to allow for multiple passes without having to reset the equipment, thereby improving throughput.

In the current example, the fine slurry may be filtered by filter 210 to remove any particles of greater than approximately 100 Microns from the slurry. In the current example, the fine slurry is pasteurized by the heater 112. For example, the heater may pasteurize the slurry by heating the slurry to a temperature of approximately 185° F. In other cases, the heater may pasteurize the slurry by heating the slurry to a temperature of approximately 161° F. In still other cases, the slurry may be pasteurized by heating to 155° F. In some instances, the slurry may be held at temperature for a length of approximately 35 minutes. In other cases, the slurry may be held at temperature for a length of time approximately 30 minutes to approximal 40 minutes in duration or for a length of time approximately 30 minutes to approximal 60 minutes in duration. In some cases, the slurry may be held at temperature for a length of time greater than or equal to 30 minutes or greater than or equal to 35 minutes.

The pasteurized slurry is provided to the rotatory atomizer associated with a drying chamber 214. For instance, the rotatory atomizer may be configured to dispense or spray the slurry into the drying chamber 214. As the slurry is dispensed into the drying chamber 214 by the rotatory atomizer, the drying chamber 214 may apply heat at a temperature which causes the water in the slurry to evaporate prior to the slurry impacting the walls of the drying chamber 214.

The dried particles may be collected from the drying chamber 214 and deposited into one or more cyclones 216. The cyclones 216 may be used to separate the dried particles removing any particle that is too small from the flour 204 or below a minimum threshold. The remaining particles may then be passed through one or more final filters 218 to remove any particles from the flour that are more than a maximum threshold. For example, the filter 218 may include one or more screens/meshes of various sizes.

In the current example, the processing devices 206-218 are shown as individual devices. However, it should be understood that the processing devices 206-218 may be combined in whole or in part. For example, the high-shear device 208 may be incorporated into the mixer 206 to approximate the recirculation loop in a single device.

Figure 3:
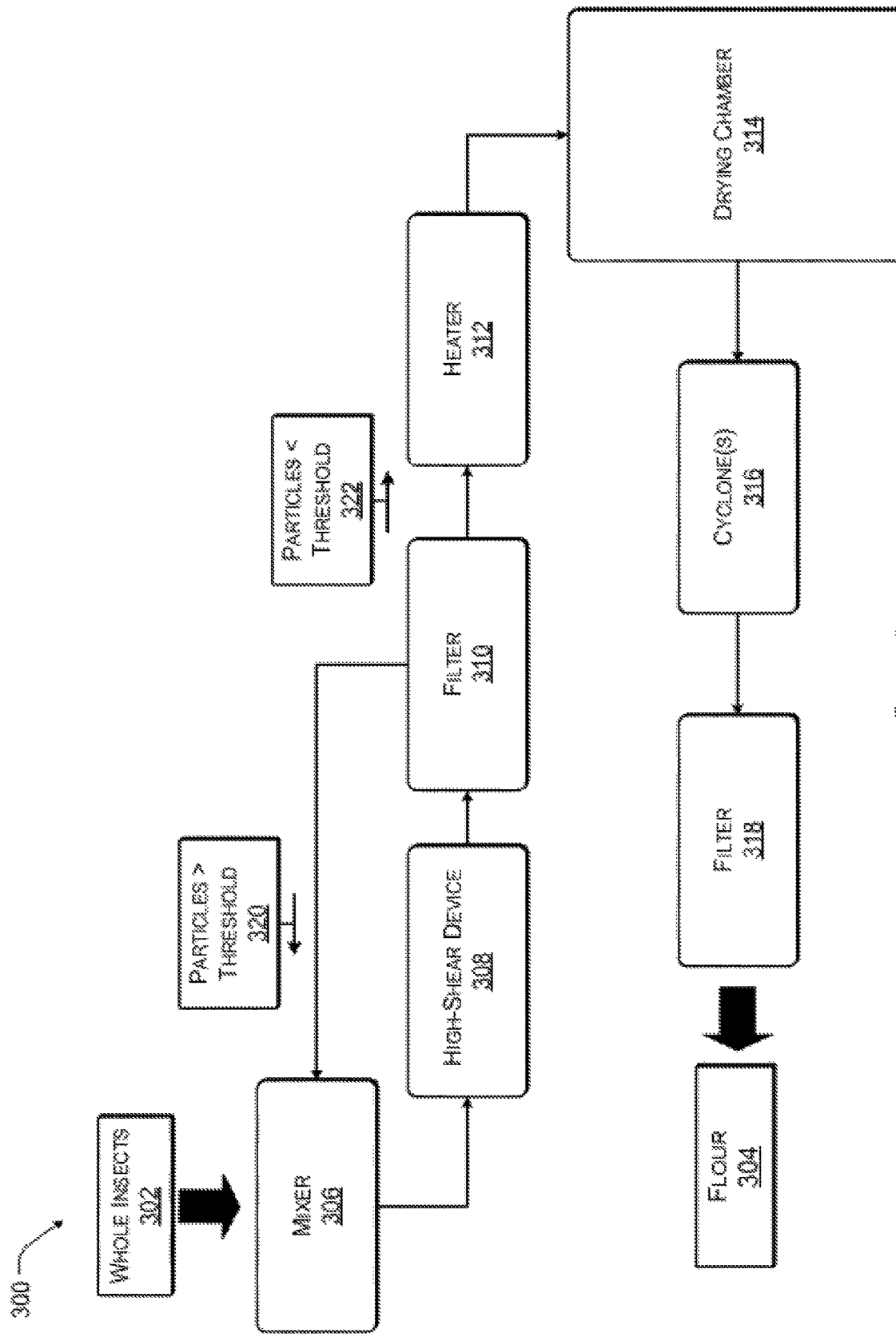
FIG. 3 illustrates another example system for processing whole insects according to some implementations.

FIG. 3 illustrates another example system 300 for processing whole insects according to some implementations. In the current example, the system 300 may be at an insect or food processing facility for converting the whole insects 302, such as crickets, into flour 304. In this example, the whole insects 302 are initially provided to a mixer 306. For instance, the mixer 306 may be a low-shear mixer configured to convert the whole insects 302 into a coarse slurry by mixing the insects 302 with water.

The coarse slurry may be provided or pumped to the high-shear device 308 to generate a fine slurry, or a slurry having particles of a size of 100 Microns or less. In the current example, the fine slurry may be filtered by filter 310 to remove any particles of greater than a threshold 320 (e.g., greater than approximately 100 Microns) from the particles less than the threshold 322. The particles 320 may then be provided back into the mixer 306 to, for instance, mix with the next batch of whole insects 302. In the current example, the particles 322 are pasteurized by the heater 312.

The pasteurized particles 322 are provided to the rotatory atomizer associated with a drying chamber 314. As the particles 322 are dispensed into the drying chamber 314 by the rotatory atomizer, the drying chamber 314 may apply heat at a temperature which causes the water in the slurry to evaporate prior to the slurry impacting the walls of the drying chamber 314.

The dried particles 322 may be collected from the drying chamber 314 and deposited into one or more cyclones 316. The cyclones 316 may be used to separate the dried particles removing any particle that is too small from the flour 304 or below a minimum threshold. The remaining particles may then be passed through one or more final filters 318 to remove any particles from the flour that are more than a maximum threshold.

Figure 4:
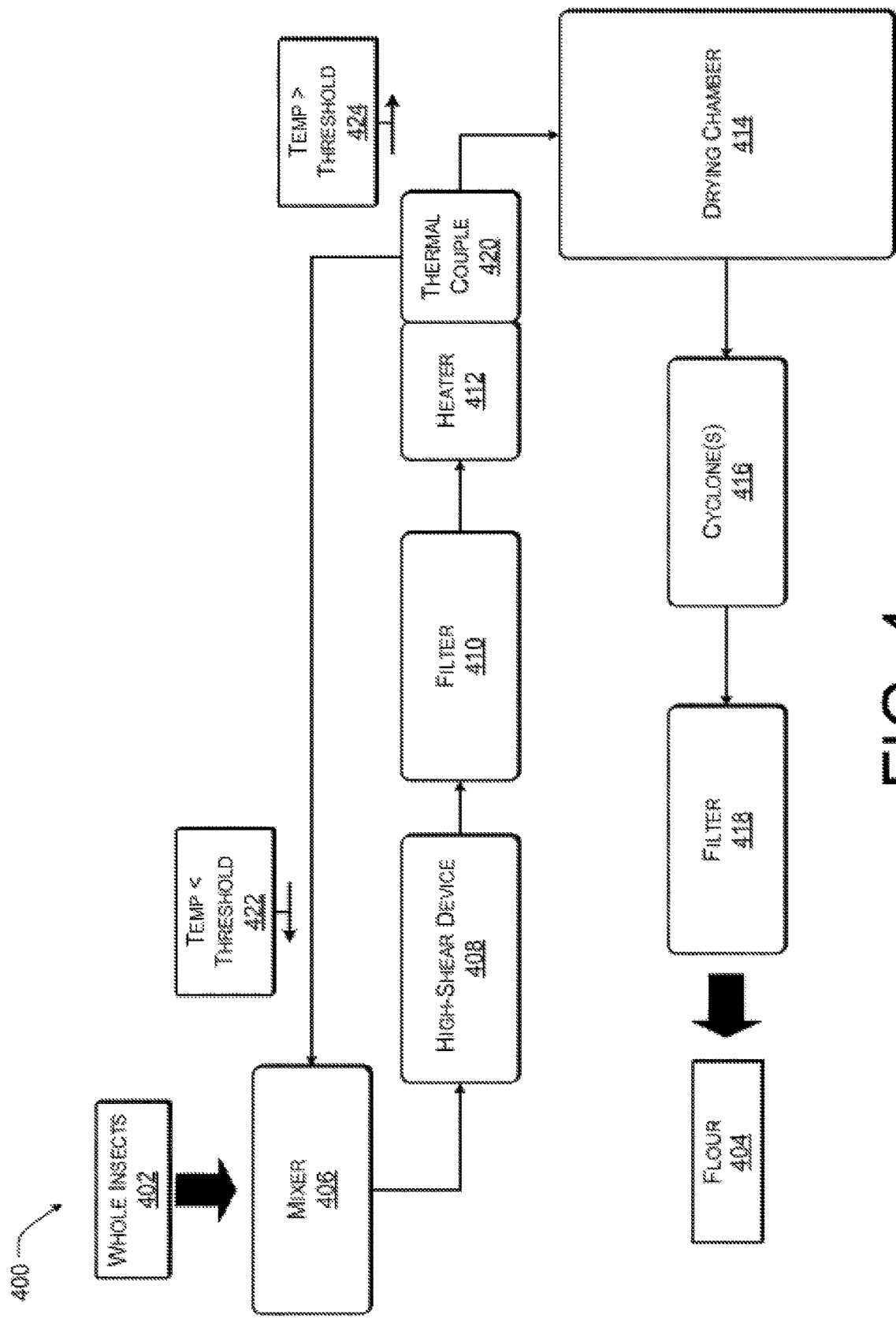
FIG. 4 illustrates another example system for processing whole insects according to some implementations.

FIG. 4 illustrates another example system 400 for processing whole insects according to some implementations. In the current example, the system 400 may be at an insect or food processing facility for converting the whole insects 402, such as crickets, into flour 404. In this example, the whole insects 402 are initially provided to a mixer 406. For instance, the mixer 406 may be a low-shear mixer configured to convert the whole insects 402 into a coarse slurry by mixing the insects 402 with water.

The coarse slurry may be provided or pumped to the high-shear device 406 to generate a fine slurry, or a slurry having particles of a size of 100 Microns or less. In the current example, the fine slurry may be filtered by filter 408 to remove any particles of greater than a threshold (e.g., greater than approximately 100 Microns) from the slurry.

In the current example, the slurry is then provided to the heater 412. The heater 412 heats the slurry for a desired period of time to attempt to pasteurize the slurry. However, in some cases, the pasteurization fails, or the slurry fails to reach a threshold internal temperature. In this implementation, a thermal couple 420 may be configured to measure the internal temperature of the slurry as the slurry exits the heater 412. If the temperature is less than the threshold 422 the particles are returned to the mixer 406 to, for instance, be incorporated into the next batch of flour 404. However, if the slurry is greater than the threshold 424, the slurry is passed to the drying chamber 414. In some cases, the threshold 422 and the threshold 424 may be the same.

As the slurry is dispensed into the drying chamber 414 by the rotatory atomizer, the drying chamber 414 may apply heat at a temperature which causes the water in the slurry to evaporate prior to the slurry impacting the walls of the drying chamber 414.

The slurry may be collected from the drying chamber 414 and deposited into one or more cyclones 416. The cyclones 416 may be used to separate the dried particles removing any particle that is too small from the flour 304 or below a minimum threshold. The remaining particles may then be passed through one or more final filters 418 to remove any particles from the flour that are more than a maximum threshold.

Figure 5:
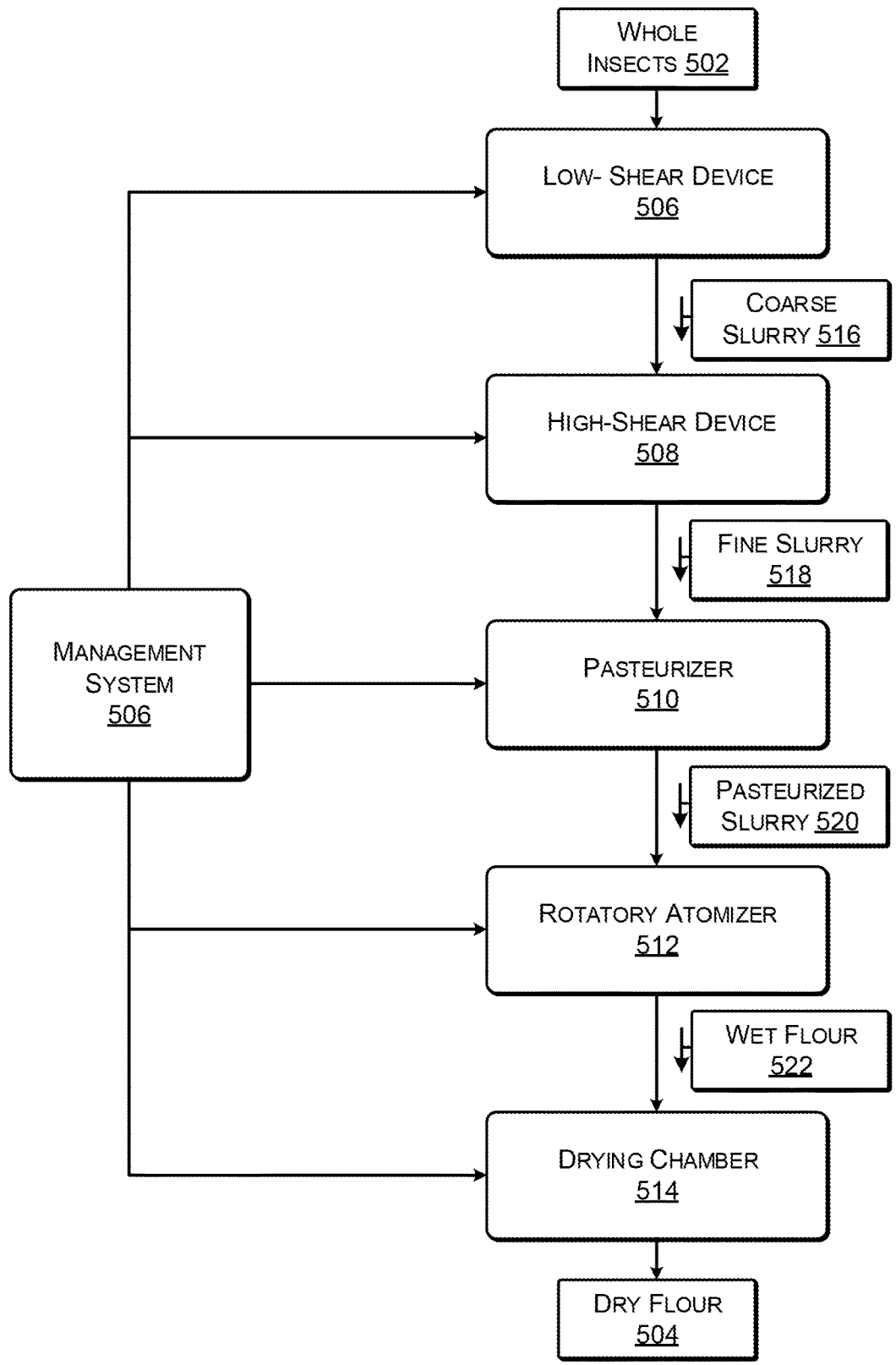
FIG. 5 illustrates an example system for processing whole insects according to some implementations.

FIG. 5 illustrates an example system 500 for processing whole insects according to some implementations. For example, some insects 502 are regularly consumed in a "flour" state in addition to a whole or semi-whole state. In some cases, the dry flour 504 is used as a high protein substitute for other types of foods including traditional bleached or wheat flours. Traditionally, the whole insects 502 are ground, wet-ground, or milled to produce the flour 504. However, using traditional techniques often results in a mix of powder and large visible insect parts which results in an unsightly product and can affect the quality and consistency of any foodstuff made with the flour 104.

In the current example, a system 500 may be at an insect or food processing facility for converting the whole insects 502, such as crickets, into dry flour 504. In this example a management system 506 may be configured to communicate with various other processing devices, such as low-shear device 506, a high-shear device 508, pasteurizer 510, rotatory atomizer 512, and a drying chamber 514. In general, the management system 506 may provide instructions to the processing devices 506-514, such as temperatures, speeds (e.g., mixer speed and disk speed), durations, spray rates, etc.

In this example, the whole insects 502 may be heated or thawed by a heater (not shown). For instance, the whole insects 502 may be frozen prior to processing to preserve the food product for longer durations. In some cases, the heater may apply a temperature of approximately 140° F. In other cases, the heater may apply a temperature in a range from approximately 100° F. to 200° F.

The de-thawed and heated whole insects 502 are then provided to a low-shear device 506. The low-shear device 506 may convert the whole insects 502 into a coarse slurry 516 which may be further processed by the high-shear device 508. For instance, the low-shear device 506 may mix the whole insects 502 while adding water at a ratio of approximately 1.5 lb of cricket to 2 lbs of water, with a resulting coarse slurry 516 that is approximately 42% insects and 58% water. In some cases, the coarse slurry 516 may have a range of 30% to 50% insect and 50% to 70% water.

The coarse slurry 516 may be provided or pumped to the high-shear device 508 to generate a fine slurry 518. For example, the fine slurry 518 may have a particle size of less than 100 Microns. The fine slurry 518 is then pasteurized by the pasteurizer 110. For example, the fine slurry 518 is keep by the pasteurizer 510 at temperature for a period of between thirty minutes to one hour or until the fine slurry 518 reaches a temperature of approximately 185° F. In other cases, the fine slurry 518 may be pasteurized for a period of between thirty minutes to one hour or until the slurry reaches a temperature of approximately 161° F.

The pasteurized slurry 520 is provided to the rotatory atomizer 512 which may be configure to dispense or spray the pasteurized slurry 520 into the drying chamber 514. For example, the rotary atomizer 516 may include a disk diameter of between approximately 170 mm and approximately 300 mm. The disk speed may be set by the management system 106 at between approximately 5000 RPMs and approximately 25,000 RPMs.

As the pasteurized slurry 520 is dispensed into the drying chamber 514, the drying chamber 514 may apply heat which causes the water in the pasteurized slurry 520 to evaporate and the insects to be reduced further in size. For example, the drying chamber 514 may include one or more screens/meshes and/or one or more cyclones to further reduce the particle size. In some implementations, the drying chamber 514 may be approximately 14 feet in diameter and approximately 14 feet tall and set by the management system 106 to a temperature of 150° F. In another example, the drying chamber 514 may be between 10 feet in diameter and 22 feet in diameter and 10 feet tall and 22 feet tall. In some cases, the drying chamber 514 may be flat-bottomed or cone-bottomed.

In the current example, the processing devices 508-514 are shown as individual devices. However, it should be understood that the processing devices 508-514 may be combined in whole or in part. For example, the low-shear device 506 and the high-shear mixer 508 may be coupled by a tube and/or the high-shear device 508 and the pasteurizer 510 may be combined to both generate the pasteurized slurry 520 at substantially the same time.

Figure 6:
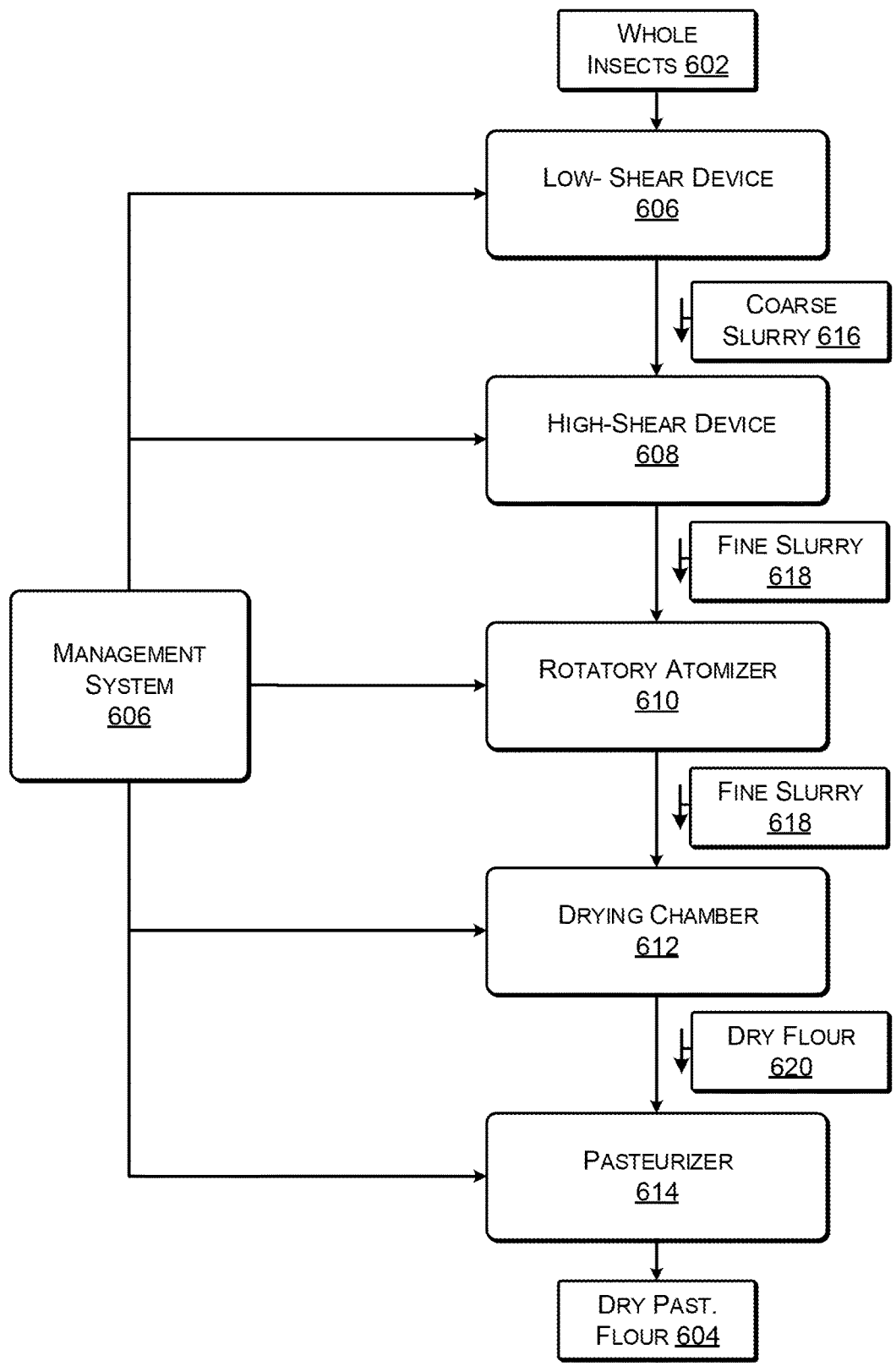
FIG. 6 illustrates another example system for processing whole insects according to some implementations.

FIG. 6 illustrates another example system 600 for processing whole insects according to some implementations. In the current example, a system 600 may be at an insect or food processing facility for converting the whole insects 602, such as crickets, into dry pasteurized flour 604. In this example a management system 606 may be configured to communicate with various other processing devices, such as low-shear device 606, a high-shear device 608, rotatory atomizer 610, a drying chamber 612, and a pasteurizer 614. In general, the management system 606 may provide instructions to the processing devices 606-614, such as temperatures, speeds (e.g., mixer speed and disk speed), durations, spray rates, etc.

In this example, the whole insects 602 are provided to a low-shear device 606. The low-shear device 606 may convert the whole insects 602 into a coarse slurry 616 which may be further processed by the high-shear device 608. For instance, the low-shear device 606 may mix the whole insects 602 while adding water.

The coarse slurry 616 may be provided or pumped to the high-shear device 608 to generate a fine slurry 618. For example, the fine slurry 618 may have a particle size of less than approximately 100 Microns. The fine slurry 618 may be provided to the rotatory atomizer 610 which may be configure to dispense or spray the slurry 618 into the drying chamber 612.

As the slurry 618 is dispensed into the drying chamber 612, the drying chamber 612 may apply heat which causes the water in the slurry 618 to evaporate and the insects to be reduced further in size and produce a dry flour 620.

The dry flour 620 is then pasteurized by the pasteurizer 614. For example, the dry flour 620 may be irradiated or exposed to radiation for a predetermined period of time to kill or exterminate any pathogens in the flour 604.

FIG. 7 provides an example flow diagram illustrating example processes for generating insect flour described above. The processes are illustrated as a collection of blocks in a logical flow diagram, which represent a sequence of operations. The order in which the operations are described should not be construed as a limitation. Any number of the described blocks can be combined in any order and/or in parallel to implement the process, or alternative processes, and not all of the blocks need be executed.

FIG. 7 illustrates an example flow diagram showing an illustrative process 200 associated with generating flour from whole insects according to some implementations. As discussed above, some insects are regularly consumed in a "flour" state in addition to a whole or semi-whole state. In some cases, the flour is used as a high protein substitute for other types of foods including protein powders like whey, soy or legume and traditional bleached or wheat flours. Traditionally, the whole insects are ground, wet-ground, or milled to produce the flour. However, using traditional techniques often results in a mix of powder and large visible insect parts which results in an unsightly product and can affect the quality and consistency of any foodstuff made with the flour.

At 702, the whole insects may be frozen. For example, following harvesting the insects may be flash frozen to increase shelf life or for long term storage. In most cases, the insects are maintained in the frozen state until processing for sale as an agricultural good to an end consumer or grocer.

At 704, heat is applied to the frozen insects. For example, the whole insects may be heated or thawed prior to processing into flour. In some cases, a heater may apply a temperature of approximately 140° F. In other cases, the heater may apply a temperature in a range from approximately 100° F. to 200° F.

At 706, a first slurry is generated from the whole insects. For example, the de-thawed and heated whole insects may be provided to a low-shear mixer to generate a coarse slurry over a period of time. For instance, the low-shear mixer may convert the whole insects into the coarse slurry by mixing the whole insects while adding water. In some examples, the water may be added at a ratio of approximately 1.5 lb of cricket to 2 lbs of water. The first slurry may have a first set of particles having a first particle size within a range, such as approximately 1-3 centimeters (cm). In one particular example, the first particle size range maybe from approximately 3 cm to approximately 100 Microns.

At 708, a second slurry may generate from the first slurry. The first slurry may then be processed by a high-shear mixer to generate a fine slurry or the second slurry having particles of less than a threshold (such as approximately 100 Microns) or within a second particle size range (such as between approximately 10 Microns and approximately 100 Microns). The resulting fine slurry may be approximately 42% insects and 58% water. In some cases, the slurry may have a range of 30% to 50% insect and 50% to 70% water.

At 710, the second slurry may be pasteurized. For example, heat may be applied to the slurry for a period of between thirty minutes to one hour or until the slurry reaches a temperature of approximately 185° F. In other cases, the second slurry may be pasteurized a period of between thirty minutes to one hour or until the second slurry reaches a temperature of approximately 161° F. in some case, the slurry may be pasteurized while the slurry is generated by the mixer. For example, hot water may be added mixer. In some cases, one of the mixers may also apply heat to the slurry to achieve the desired temperature of 185° F.

At 712, the second slurry is dispersed into a drying chamber using a rotary atomizer. In some case, the rotary atomizer dispensed the slurry at a rate of approximately 1715 pounds per hour. In other cases, the flow rate associated with dispensing the second slurry was between approximately 1500 and 2000 pounds per hour. In some implementations, the drying chamber may be approximately 14 feet in diameter and approximately 14 feet tall and set to a temperature of 150° F. In another example, the drying chamber may be between 10 feet in diameter and 22 feet in diameter and 10 feet tall and 22 feet tall. In some cases, the drying chamber 114 may be flat-bottomed or cone-bottomed. The rotary atomizer may include a disk diameter of between approximately 170 mm and approximately 300 mm. The disk speed may be set at between approximately 5000 RPMs and approximately 25,000 RPMs.

At 714, the dried particles are separated into a third set of particles having a particle size smaller than a third particle size from a fourth set of particles having a particle size greater than the third particle size. For example, the third particle size may be 100 Microns or less than 50 Microns. In some cases, some of the insect material may not achieve the desired size of smaller than 100 Microns and, thus, be separated from the rest of the particles for reprocessing. In some cases, the third and fourth set of particles may be separated using a mesh or screen as well as one or more cyclones associated with the drying chamber.

At 716, the fourth set of particles is reprocessed or added back into the slurry. For example, the third set of particles may be added to the whole insects being processed by the mixer or to the slurry after pasteurization.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for generating insect-based flour comprising:
   generating a slurry from whole insects by spraying the whole insects with water for a period of time greater than one hour, prior to reducing a size of suspended particles of the slurry;
   reducing, by a mixer and a first shear device, the size of the suspended particles of the slurry to less than 100 microns by first mixing the slurry by an impeller of the mixer set to a first rate 1140 RPM for a first period of time and a second rate 1800 RPM for a second period of time at a temperature of approximately 140° F. in the mixer, second processing the slurry by the first shear device at a first rotational speed of between 35 HZ and 60 HZ, third returning the slurry to the mixer to reheat the slurry to 140° F., and fourth re-processing the slurry by the first shear device at a second rotational speed of between 50 HZ and 80 HZ;
   dispensing, by a rotary atomizer, the slurry into a drying chamber to generate dried particles; and separating the dried particles using at least one cyclone and a mesh to generate the insect-based flour.

2. The method as recited in claim 1, further comprising pasteurizing the slurry prior to dispensing into the drying chamber.

3. The method as recited in claim 1, further comprising heating the whole insects prior to generating the slurry.

4. The method as recited in claim 1, further comprising grinding the slurry to reduce the particle size below a first particle size threshold prior to dispensing the slurry into the drying chamber.

5. The method as recited in claim 1, wherein dispensing the slurry into the drying chamber includes utilizing a rotary disk having a diameter of between approximately 170 mm and approximately 300 mm.

6. The method as recited in claim 1, wherein dispensing the slurry into the drying chamber includes utilizing a rotary disk spinning at a rate of approximately 5000 RPMs and approximately 25,000 RPMs.

7. The method as recited in claim 1, wherein dispensing the slurry into the drying chamber is at a rate of approximately 1715 pounds per hour.

8. The method as recited in claim 1, wherein dispensing the slurry into the drying chamber is at a rate of between approximately 1700 and 1750 pounds per hour.

9. The method as recited in claim 1, wherein the at least one cyclone is at least two cyclones and wherein the mesh is a 40 mesh sifter.

10. The method as recited in claim 1, wherein generating the slurry includes mixing the whole insects while introducing the water and applying heat to pasteurize the slurry.

11. The method as recited in claim 2, wherein pasteurizing the slurry includes holding the slurry at a desired temperature for at least 35 minutes.

12. A method for generating cricket based flour comprising:
   placing whole crickets into a wire basket;
   heating whole crickets by rinsing the whole crickets within the wire basket with water at a temperature of between 35° F. and 80° F. for a period of greater than two hours and less than three hours;
   generating, at a mixer, a first slurry from the whole crickets by mixing the whole crickets while water at a temperature of approximately 140° F. is added to the whole crickets at a rate of 2.0 pounds of the water to 1.5 pounds of the whole crickets, the mixer including an impeller that is initially set to a rate of 1140 RPM'S and increased to a rate of 1800 RPM'S after a period of time elapses;
   generating, at a first shear device, a first fluid, the first fluid having a particle size of less than 100 microns and the first shear device having a rotational speed of between 35 HZ and 60 HZ;
   drying the first fluid;
   re-suspending the dried first fluid by mixing with additional water at the temperature of approximately 140° F. at the rate of 2.0 pounds of the water to 1.5 pounds of the dried fluid;
   generating, at the first shear device, a second slurry, the second slurry having the particle size of less than 100 microns and the first shear device having the rotational speed of between 35 HZ and 60 HZ;
   filtering the second slurry to generate a first portion and a second portion;
   pasteurizing the second portion of the second slurry; and
   dispensing at a rate of between approximately 1500 pounds per hour and 2000 pounds per hour, by a rotary atomizer having a disk with a diameter of between approximately 170 mm and approximately 300 mm and rotating at a speed of between approximately 5000 RPMs and approximately 25,000 RPMs, the pasteurized second portion into a drying chamber to generate a first resulting product, the drying chamber between approximately 10 feet in diameter and approximately 22 feet in diameter and approximately 10 feet tall and approximately 22 feet tall;
   mixing, at the mixer, the first portion with additional whole insects and additional water to generate a third slurry, the additional water at a temperature of approximately 140° F.;
   generating, at the first shear device, a second fluid from the third slurry, the second fluid having a particle size of less than 100 microns and the first shear device having a rotational speed of between 35 HZ and 60 HZ;
   pasteurizing the second fluid; and
   dispensing at the rate of between approximately 1500 pounds per hour and 2000 pounds per hour, by the rotary atomizer at the speed of between approximately 5000 RPMs and approximately 25,000 RPMs, the second fluid into the drying chamber to generate a second resulting product;
   drying the first resulting product and the second resulting product; and
   filtering the first resulting product and the second resulting product to remove any product greater than a desired particle size using at least two cyclones and at least two mesh sifters to generate the cricket-based flour.

13. The method as recited in claim 12, wherein heating the whole crickets includes thawing the whole crickets from a frozen state.

14. The method as recited in claim 12, wherein the drying chamber is approximately 14 feet in diameter and 14 feet in height.

15. The method as recited in claim 12, wherein the rotary atomizer dispenses the slurry at a rate of approximately 1715 pounds per hour.

16. A method for generating insect-based flour comprising:
   generating a slurry of water and insect parts by spraying whole insects with water for a period of time greater than one hour, the period of time received from a management system;

converting, by a mixer and a first shear device, the slurry of water and insects parts into a fluid with no suspended particles greater than 100 microns in size by passing the slurry through the mixer and the first shear device at least two times, a speed of the mixer controlled by the management system;

grinding the fluid to reduce the particle size below a first particle size threshold;

pasteurizing the fluid;

dispensing, by a rotary atomizer utilizing a rotary disk having a diameter of between approximately 170 mm and approximately 300 mm, the fluid into a drying chamber in response to a completion of the pasteurization, a speed of the rotary disk controlled by the management system; and separating dry particles produced by the drying chamber using at least one cyclone and a 40 mesh sifter to generate the insect-based flour.

17. The method for generating insect-based flour as recited in claim 16, further comprising heating whole insects prior to generating the slurry.

18. The method for generating insect-based flour as recited in claim 16, wherein generating the slurry includes mixing whole insects while introducing the water.

* * * * *